No. 897,395. PATENTED SEPT. 1, 1908.
E. J. PETRU & J. ZIDEK.
HOSE NOZZLE CART.
APPLICATION FILED AUG. 31, 1907.

Witnesses:
Frank Blanchard
J S Abbott

Inventors,
Emanuel J. Petru
Joseph Zidek.
By Burton & Burton
Attorneys.

No. 897,395. PATENTED SEPT. 1, 1908.
E. J. PETRU & J. ZIDEK.
HOSE NOZZLE CART.
APPLICATION FILED AUG. 31, 1907.

No. 897,395. PATENTED SEPT. 1, 1908.
E. J. PETRU & J. ZIDEK.
HOSE NOZZLE CART.
APPLICATION FILED AUG. 31, 1907.

Witnesses:
Frank Blanchard
J. S. Abbott

Inventors.
Emanuel J. Petru.
Joseph Zidek.
By Burton & Burton
Attorneys.

UNITED STATES PATENT OFFICE.

EMANUEL J. PETRU AND JOSEPH ZIDEK, OF CHICAGO, ILLINOIS.

HOSE-NOZZLE CART.

No. 897,395.  Specification of Letters Patent.  Patented Sept. 1, 1908.

Application filed August 31, 1907.  Serial No. 390,867.

*To all whom it may concern:*

Be it known that we, EMANUEL J. PETRU and JOSEPH ZIDEK, citizens of the United States, both residing at Chicago, in the county of Cook and State of Illinois, have invented new and useful Improvements in Hose-Nozzle Carts, of which the following is a specification, reference being had to the accompanying drawings, forming a part thereof.

The purpose of this invention is to provide a carriage for carrying a discharge nozzle of a fire-extinguishing apparatus adapted to be protruded into a narrow passage-way, as a narrow alley or through the entrance of a building into the building, so as to locate the nozzle at a considerably long distance from the point at which the operator stands to manipulate the carriage and thus project it for carrying the nozzle to the desired position, and to provide on such carriage means by which the nozzle may be controlled as to direction and position from the same remote point at which the operator manages the carriage.

It consists in the organization shown and described and the combination of the several elements coöperating for the result stated as set out in the claims.

In the drawings: Fig. 12 is an inverted plan view.

The more complete form of the structure of the invention, as shown in Figs. 3 to 13 inclusive, will first be described.

Figures 3, 16:
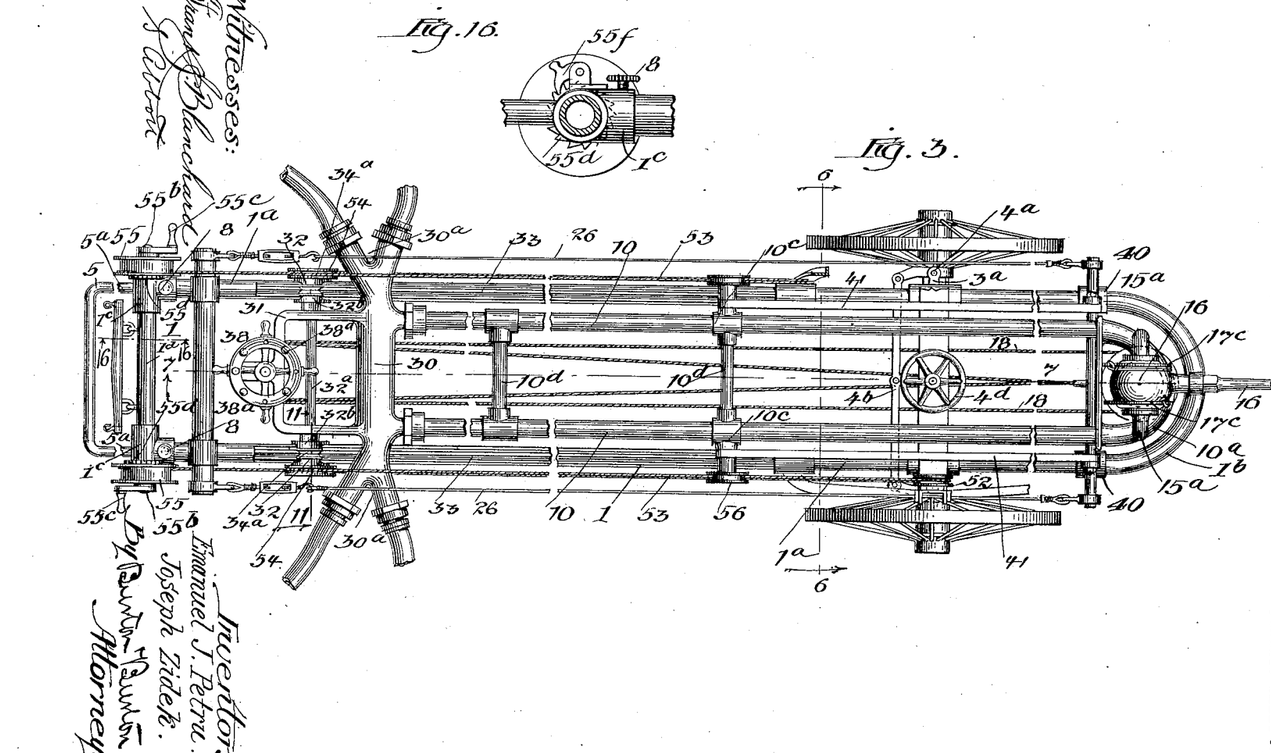
Fig. 3 is a plan view of a modified structure having provision for elevating the nozzle bodily as well as for controlling its direction.
Fig. 16 is a detail section at the line 16—16 on Fig. 3.

There is provided a horizontal frame structure, 1, preferably of pipe, as illustrated, bent to form two parallel arms, $1^a$, and mounted by means of interposed springs, 2, 2, upon a bolster, 3, to which, by means of knuckle joints, $3^a$, the spindles, $4^a$, of the carrying wheels, 4, 4, are connected. The customary steering means are provided consisting of a link bar, $4^b$, connecting the lever arm, $4^c$, of the spindles, $4^a$, and the steering hand wheel, $4^d$, has its shaft, $4^e$, journaled on the yoke, 15, hereinafter mentioned, the shaft being provided with a lever arm, $4^f$, connected to the bar, $4^b$, for operating it to set the spindles in a well understood manner. The carrying wheels are preferably nearer the forward or bowed end of the frame, and for extending the frame at the other end there is provided a second bow, 5, formed by bending smaller pipe upon itself to form parallel arms, $5^a$, which telescope within the parallel arms, $1^a$, of the tubular frame 1. When withdrawn to the full extent for which the telescoping arms are adapted, the bow, 5, affords room for accommodating a draft horse within it, forward of a cross bar, $1^d$, which joins the ends of the parallel arms, $1^a$, of the frame, 1, and set screws, 8, 8, taking into T-fittings, $1^c$, which connect cross bars, $1^d$, to the side arms, $1^a$, of the frame, may serve to secure the telescoping bow or frame, 5, at any position to which it may be adjusted by telescoping with the frame, 1. Upon this horizontal frame structure there is mounted a pipe structure comprising two parallel pipes, 10, 10, connected at the forward end of the device just within the bow of the horizontal frame, 1, by a return bend fitting, $10^a$, and connected at the opposite ends by the branched fitting, 30, seen most clearly in Fig. 3, which has two branches, $30^a$, at each side for hose connection, as illustrated. This fitting, 30, has rigid with it, and preferably comprises integrally as illustrated in Fig. 3, an open rectangular frame, 31, extending at the rear of the fitting, for the purpose of affording bearings and support to the operating parts which necessarily move with the pipes, 10, 10. The return bend fitting, 10$^a$, is enlarged within the bend forming a globe chamber, 12, which is centrally pierced vertically to receive a spindle, 13, which has an axial cavity, 13$^a$, extending from its upper end down to a point within the globe chamber, 12, from which radial apertures, 13$^b$, lead out to the surface of the spindle for opening into the globe chamber. This spindle is tapered for fitting its seat in the globe chamber into which it is inserted from the lower end, nuts, 13$^c$ and 13$^d$, at the lower and upper sides, respectively, of the globe, 12, serving to retain it in proper relation to the globe, suitable washers, 13$^e$, 13$^e$, being interposed between the globe and the nuts. At the lower end of the spindle it is provided with a squared terminal, 13$^f$, for receiving a pulley, 14, by which it may be rotated in the globe, 12.

Figures 7, 8, 9, 10:
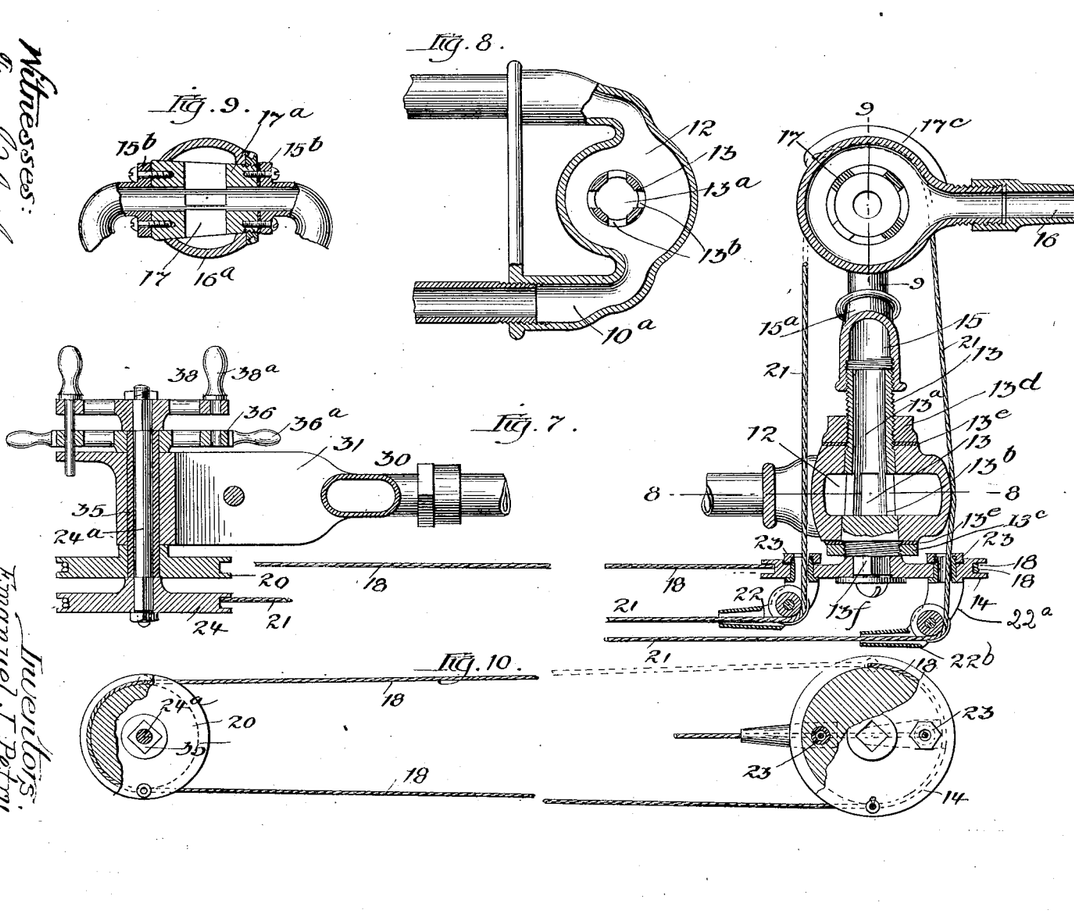
Fig. 7 is a section at the line 7—7 on Fig. 3.
Fig. 8 is a section at the line 8—8 on Fig 7.
Fig. 9 is a section at the line 9—9 on Fig. 7.
Fig. 10 is a partly sectional plan view of the pulleys and cable for operating the nozzle, the pulleys being broken away and shown in section at the planes indicated by the lines 10—10 on Fig. 7.
Figure 11:
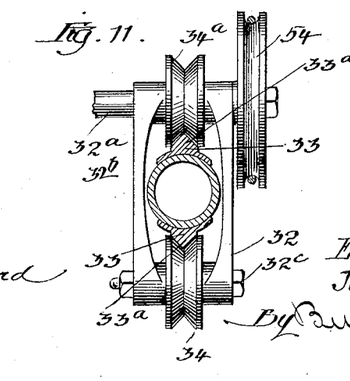
Fig. 11 is a detail section at the line 11—11 on Fig. 3 upon an enlarged scale.

15 is a pipe yoke which is secured on to the upper end of the hollow spindle, 13, its two branches, 15$^a$, 15$^a$, being extended first divergently and then inwardly curved toward each other, terminating in parallel flanges, 15$^b$, facing each other at a sufficient distance apart to admit between them the globe base, 16$^a$, of the nozzle, 16. This globe base is provided with a tapering axial aperture in which a tapering plug or spindle, 17, is adapted to seat and be made water-tight, said spindle being of proper length to connect the two flanges, 15$^b$, which are bolted to its opposite ends respectively, thereby making the spindle rigid with the pipe yoke, 15, of which it is substantially a part, the nozzle being adapted to swing about the spindle by the rotation of its globe, 16$^a$, on the latter. Two plies of cable, 18, 18, are wrapped in opposite directions each about half way around the pulley, 14, having their ends secured thereto, the two plies running off from the opposite sides of the pulley and thence to the pulley, 20, which is mounted on the rear side of the rectangular frame, 31, above described. The two plies of the cable are each wrapped about and secured at their ends to the pulley, 20, in the same manner as they are wrapped about and secured to the pulley, 14, the extent of each cable wrapped on the two pulleys being substantially the same and not less than half the circumference of the pulley, 14, so that by rotating the pulley, 20, both ways from its normal or intermediate position at which the two cables are equally wrapped on it, the operator will rotate the pulley, 14, through one-hundred-eighty degrees in each direction, there being thus provided a capacity for full rotation to swing the nozzle through a complete circle in order that it may be given direction toward any point of the compass from the axis of the spindle, 13. The two ends of the cable, 21, are connected to two flanges, 17$^c$, on the globe base of the nozzle, 17, after wrapping in opposite directions about it about half its circumference, and each ply of the cable then extends therefrom down about the guides, 22, 22, which are mounted on the lower side of the pulley, 14, for guiding the cord through eyes, 23, 23, formed in said pulley to form the passage of the cable. From the guides, 22, the two plies of the cable extend to an operating pulley, 24, to which they are attached in the same manner as the plies of the cables, 18, are attached to the pulley, 20. The cord guides, 22, which are preferably pulleys or rolls, as shown, are mounted respectively in hangers, 22$^a$, which are swiveled to the pulley, 14, at the cord eyes, 23, and are provided with tubular cord run-ways or elongated guides, 22$^b$, formed as rigid extensions of the hangers toward the rear for the cable, 21, running from the guide rolls, 22, rearward to the operating pulley, 24. By this means the cables, 21, always hold the guide rolls, 22, in proper position,—that is, with their axes transverse to the stress of the cables throughout all changing adjustments of the pulley, 14, which are effected by the cable, 18, to give the nozzle its horizontal swing, and the cable is thus prevented from being deflected out of the guide-ways provided on the globe, 16$^a$, and is caused to run with equal smoothness at its change of direction from vertical to horizontal below the pulley, 14, whatever be the relative position of the two guides,— that is, whether they are in line fore-and-aft or in line transverse or oblique to the axis of the pulley, 14. The shaft, 24$^a$, of the pulley, 24, extends up through the hollow shaft, 35, of the pulley, 20, journaled, as stated, on the rear side bar of the rectangular frame, 31, and at the upper end above the end of said hollow shaft it has secured rigidly to it an operating hand-wheel, 38, having upwardly projecting handles, 38$^a$. The tubular shaft, 35, of the pulley, 20, has secured at its upper ends above the bearings of said shaft a hand-wheel, 36, provided with radially projecting handles, 36$^a$, as seen in Fig. 7, for operating it.

It will be seen that by virtue of the adaptation of the spindle, 13, to be rotated through an entire circle about its vertical axis, and the adaptation of the nozzle, 17, to be swung through a vertical arc of more than ninety degrees about the horizontal axis of the globe base, the nozzle can be made to point in any direction above the horizontal plane in which the axes of the two spindles, 13 and 17$^a$, intersect, and also to point downward from that plane to the extent that the vertical adjustment exceeds ninety degrees. For stiffening the horizontal frame, 1, there may be provided strain cables, 26, 26, secured at their ends near the front and rear ends of each of the side bars, 1$^a$, of the frame, and intermediately extending through eyes on the upright post of the standards, 51, hereinafter described.

The rectangular frame, 31, besides carrying the cable-operating pulleys serves as the means for pivoting said fitting and thereby the entire structure connected therewith, including the pipe lines, 10, and the nozzle, to a trolley carriage consisting of the similar opposite side plates, 32, 32, which are situated outside the side bars, 1ª, of the horizontal frame and are connected by a shaft, 32ª, which extends across the frame above said side bars. Upon the upper and lower sides of said side bars, 1ª, there are mounted track rails, 33, having V-shaped ribs, 33ª, and on the frame plates, 32, there are journaled pulleys, 34, 34 and 34ª, having V-shaped grooves adapting them to ride on and engage with said rolls and thereby to keep the carriage which comprises said plates, 32, accurately in position for traveling along the side bars, 1ª. The upper track pulleys, 34ª, are most conveniently journaled on the shaft, 32ª. For carrying the lower track pulleys, 34, keeping them accurately in position, there is pivoted at the inner side of each of the side bars, 1ª, a plate, 32ᵇ, which is a counterpart of the outside plate, 32, and is hung on the shaft, 32ª, just inside the upper pulley, 34ª, and connected with the outer plates, 32, by bolts, 32ᶜ, 32ᶜ, which constitute the axles of said lower pulleys, 34. (See Fig. 11.)

Figure 4:
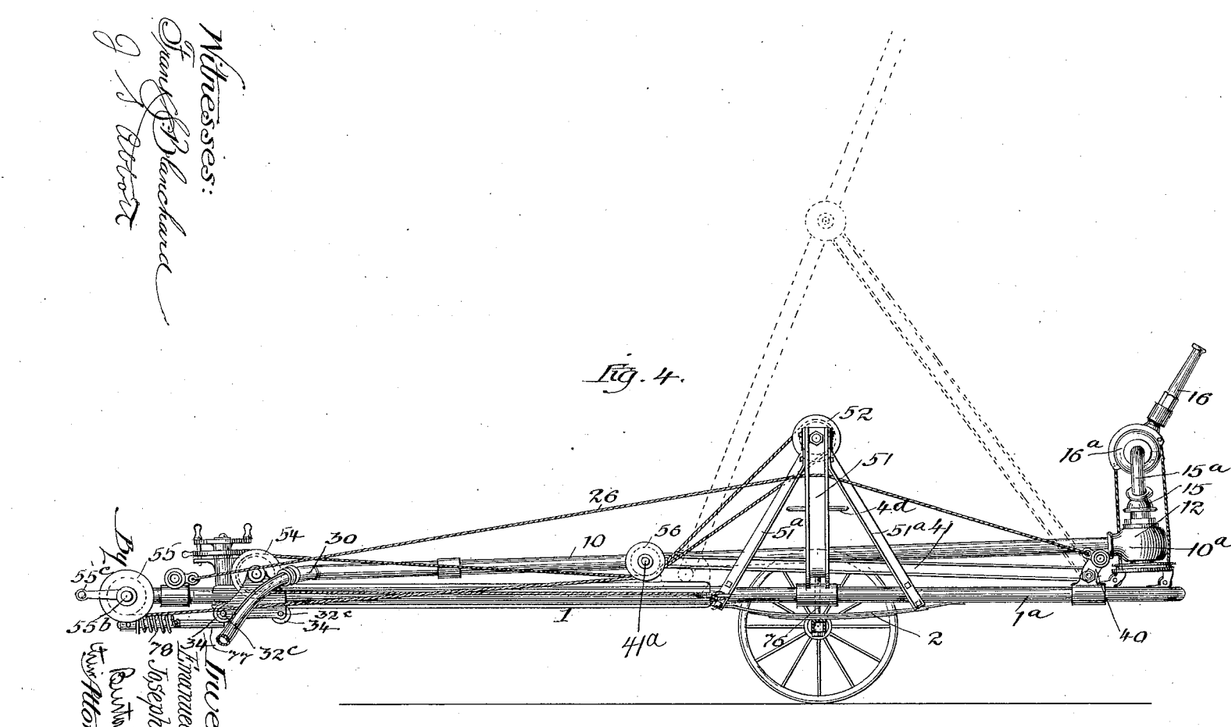
Fig. 4 is a side elevation of the form shown in Fig. 3.
Figures 5, 15:
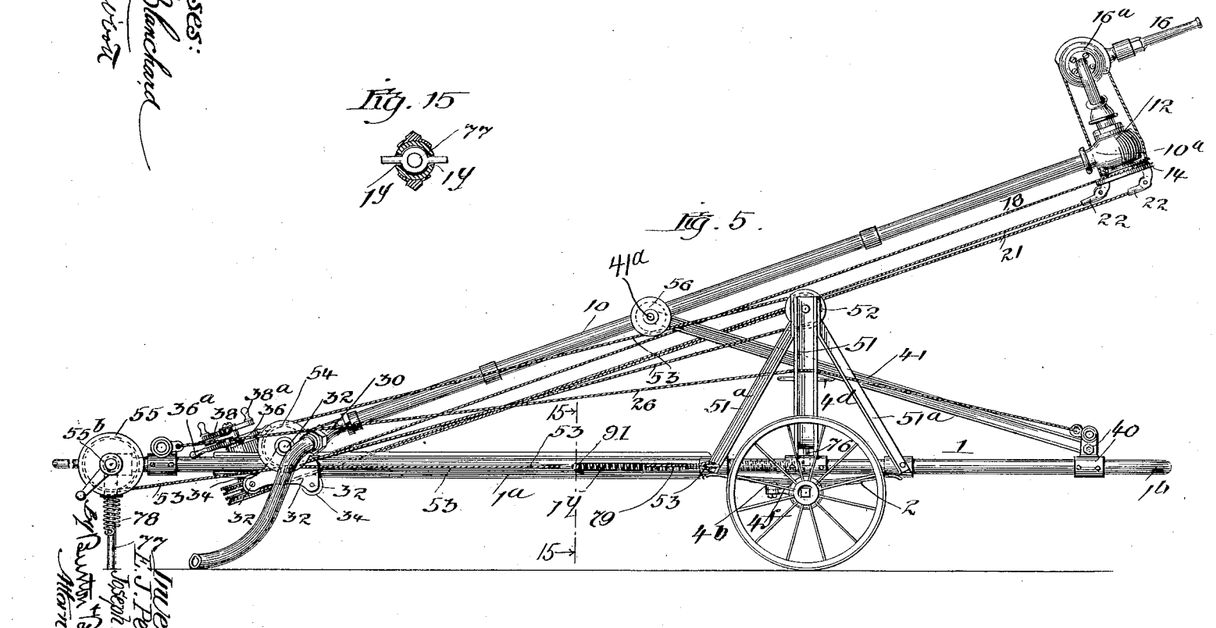
Fig. 5 is a side elevation of the structure shown in Figs. 3 and 4 having the nozzle elevated bodily above the position shown in Fig. 4.
Fig. 15 is a detail section at the line 15—15 on Fig. 5.

Near the forward end of the horizontal frame, 1, just back of the bow, 1ᵇ, fittings, 40, 40, are secured to the side bars, 1ª, which afford pivotal attachment for brace links, 41, 41, which extend from their pivotal connections on said fittings, 40, each to a point about midway in the length of the pipes, 10, 10, and are pivotally connected with said pipes respectively at the fittings, 10ᶜ, 10ᶜ, already mentioned, as seen clearly in Fig. 3. It will be seen that by the provision for guiding the rear end of the pipe structure in travel along the frame bars, 1ª, and connecting the pipes intermediate the nozzle and the rear end by means of the links, 41, with fixed pivot points at the forward end of the frame, it is made possible to tilt the pipe line up, as shown in Fig. 5, or still further, as shown in dotted line in Fig. 4, by merely advancing the rear end along the tracks on which it is mounted for travel. In order to effect the elevation of the forward end carrying the nozzle in this manner, actuating devices are provided consisting of cables and operating means shown in Figs. 3, 4, 5 and 6, which will now be described.

Figure 6:
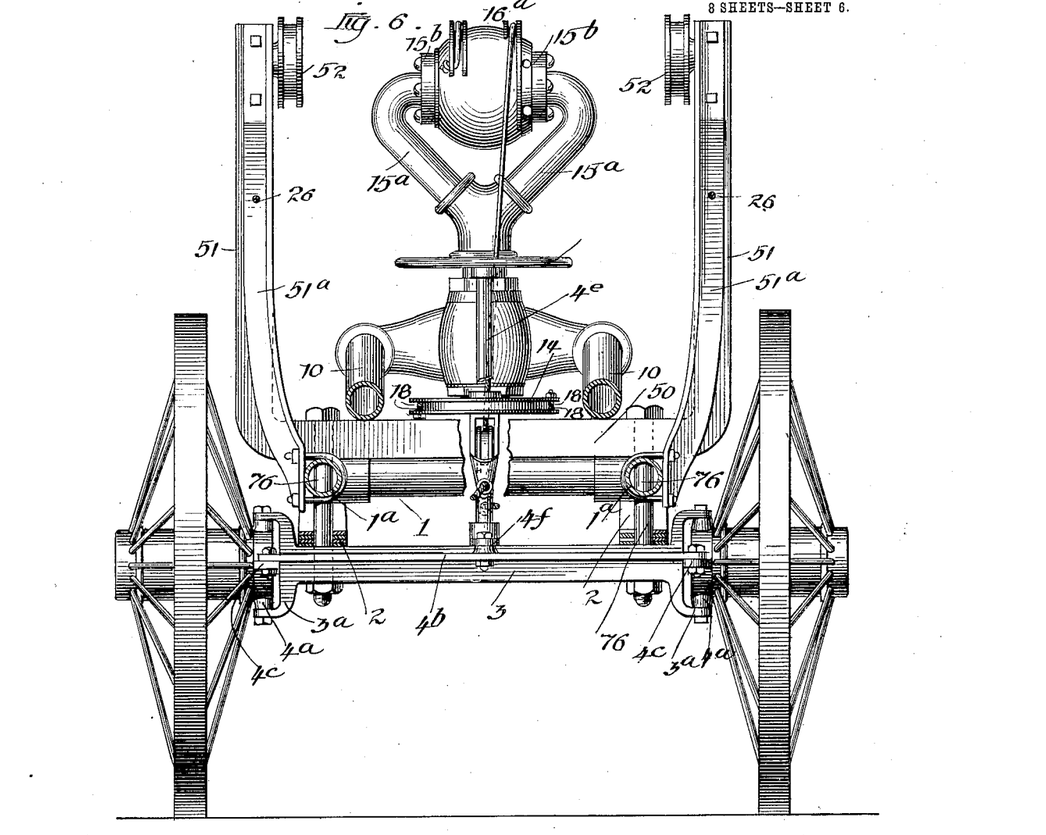
Fig. 6 is a section at the line 6—6 on Figs. 3 and 4.

Upon the horizontal frame there is erected directly over the axle bolster, 3, a U-shaped yoke, 50, whose upstanding arms, 51, constitute the middle vertical elements of similar standards erected on the two side bars of the frame, each standard comprising in addition to such middle element front and rear bracing elements, 51ª, 51ª, as seen most clearly in Figs. 5 and 6. At the upper end or apex of each standard on its inner side (see Fig. 6), there is mounted a pulley, 52. To each side bar, 1ª, at any convenient point, as at the foot of the brace bar, 51ª, of the standard, there is attached one end of a cable, 53, (the construction being the same at both sides). Each cable extends from said attachment rearward around a pulley, 54, mounted on the carriage plate, 32, at the end of the shaft, 32ª, which extends, as stated, above the side bars, 1ª. Making a loop to embrace this pulley, said cable extends thence up to the pulley, 52, about which it is looped and from which it extends back toward the rear end of the structure, and passing under the shaft, 32, it extends to a drum, 55, to which it is attached and about which it is wound. On the way from the pulley, 53, to the pulley, 52, this cable is deflected downward and laps under a pulley, 56, which is mounted at the pivot of the brace link, 41, with the pipe, 10, the stud which constitutes the pivot of said link to the fitting, 10ᶜ, on the pipe serving as a stud axle for said pulley, 56. A like deflection of the cable occurs in the portion extending from the pulley, 52, to the drum, 55. In both cases the deflection disappears when the pipe structure has been lifted to the position shown in Fig. 5, but exists when the pipe structure is at its lowest position, as seen in Fig. 4. The two drums, 55, at opposite sides of the structure are mounted on the same shaft, 55ᵇ, on which there are provided crank handles, 55ᶜ, for rotating said shaft and both of the drums thereon. Each drum is provided with a ratchet, 55ᵈ, with which a locking dog, 55ʳ, engages to retain the drum against unwinding movement and so to hold the pipe and nozzle in elevated position, the dogs being adapted to be disengaged for unwinding the drums to let down the pipe and nozzle. In the operation of this structure, it will be observed that in starting from the horizontal position of the pipe, while the fact that the brace links, 41, make very slight angle with the pipe, 10, will operate against starting the pipe up, on the other hand two plies of the cable at each side are at this position deflected under and engaged with the pulleys, 56, respectively, so that there is a direct lift exerted by the cables on the pipe at the line of pivoting of the links, 41, to the pipe, and this lift continues diminishing in force or effectiveness, until the pipe reaches the position shown in Fig. 5, at which the upper ply of the cable extends in a straight line under the lower edge of the pulley; and by the time this position has been reached, the angle between the links, 41, and the pipes, 10, is such that the direct draft of the cable on the lower rear end of the pipe for sliding it forward is sufficient to continue the lifting movement. In Fig. 4, the most elevated position of the pipe is shown in dotted line. It will be observed that the length of the pipe being nearly the length of the horizontal frame, 1, this construction provides means for elevating the nozzle to a height nearly equal to the length of said frame.

In practice, it is contemplated that the length of the horizontal frame without the extension provided for by the telescoping bow, 5, may be from twenty to thirty feet, so that the nozzle may be elevated to the height of a second or third story window of an ordinary building, and the nozzle may then be turned horizontally, or even downwardly if desired, in order to throw a stream of water directly into such window in order to reach a remote point on the floor, this being a result which would be unobtainable without the means for elevating the nozzle; and when the window or other opening which might be available for the purpose of throwing such a stream through it opens on to an alley or narrow passage which might be unsafe for entrance by a fireman, the full length of the entire structure, including the extension bow, 5, may be protruded into such alley or narrow passage; and the nozzle being first set in the proper direction, the devices may be operated to elevate the nozzle without requiring the operator to enter the dangerous alley or passage-way for that purpose. It will also be observed from Fig. 5 that a very considerable elevation of the nozzle is obtained by means of a relatively small advance of the rear end of the pipe having the devices for operating the cables for turning the nozzle into desired direction, and that the nozzle can be elevated to the height of a second story and operated after being thus elevated for adjusting its direction by an operator standing nearly at the rear end of the apparatus, twenty or thirty feet back of the point at which the nozzle is located.

Figure 12:
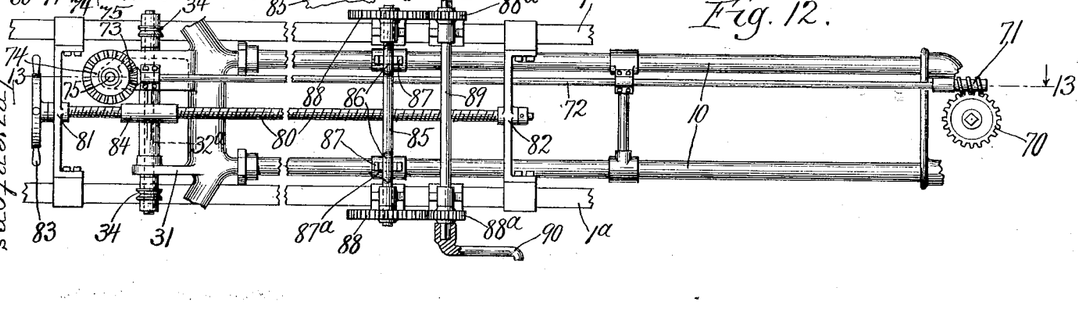
Figures 13, 17:
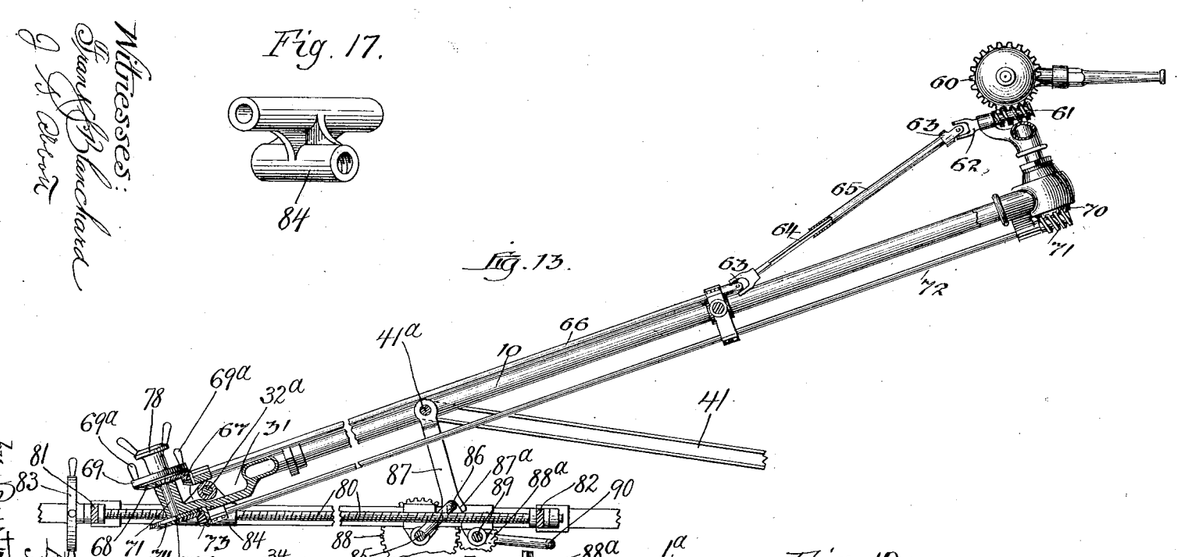
Fig. 13 is a partly sectional elevation of the nozzle-carrying frame adapted for elevating the nozzle bodily, as in Fig. 5, having a modified form of mechanism for elevating and for operating the nozzle to control its direction, section for Fig. 13 being made at the line 13—13 on Fig. 12.
Fig. 17 is a perspective view of a pivoted nut or traveler for the elevating screw shaft of the form shown in Figs. 12 and 13.

In Figs. 12 and 13 there is shown means for turning the nozzle in desired direction without use of cables. The nozzle in this construction has rigid with it a gear, 60, which is engaged by a worm, 61, on a short shaft, 62, journaled in the yoke, 9; the shaft, 62, being connected by a toggle-joint, 63, 63, and telescoping sections, 64, 65, with a shaft, 66, which is journaled parallel with the pipe, 10, and at its rear end has a bevel pinion, 67, meshing with a bevel gear, 68, on the lower side of the hand-wheel, 69, which is mounted for rotation in the same position as the wheel, 36, of the cable-operated frame (see Fig. 7). By rotating the hand wheel, 69, it will be seen that the nozzle may be rotated in a vertical plane. For rotating it in horizontal plane,—that is, about the axis of the spindle, 13,—there is provided at the lower end of the spindle in the position occupied by the pulley, 14, in the other form (see Fig. 9) a gear, 70, which is engaged by a worm, 71, on a shaft, 72, which extends rearward and is journaled on the rectangular frame, 31, having at its rear end a pinion, 73, meshing with a bevel gear, 74, from the lower end of a shaft, 75, which extends up through its bearing on the cross bar of the frame, 31, and through the gear-and-hand-wheel, 67, 68,—which is journaled on said shaft,—and above said gear-and-hand-wheel has a hand wheel, 78, by which the shaft, 75, and gear, 74, are rotated for rotating the gear, 70, and spindle, 13, about the axis of the latter.

Figure 1:
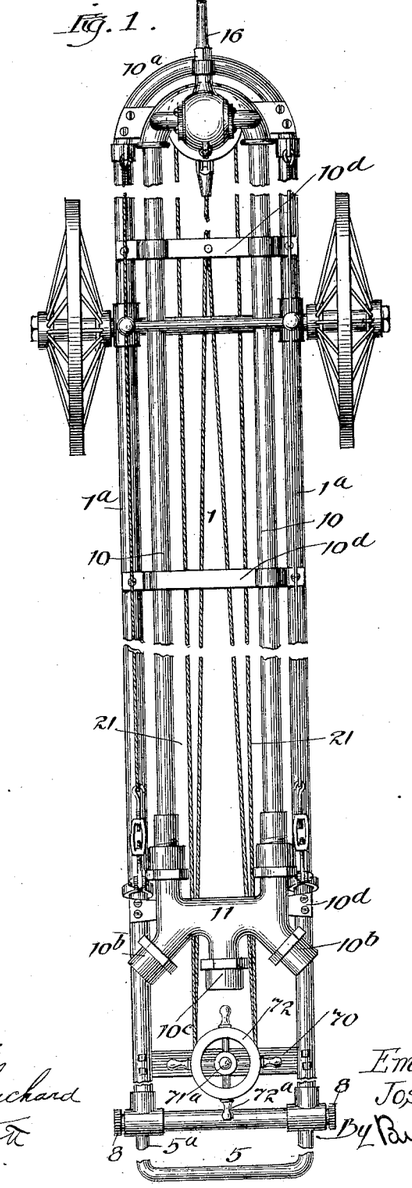
—Figure 1 is plan view of a simple form of our invention in which there is provision for directing the nozzle, but no provision for elevating it bodily.
Figures 2, 14:
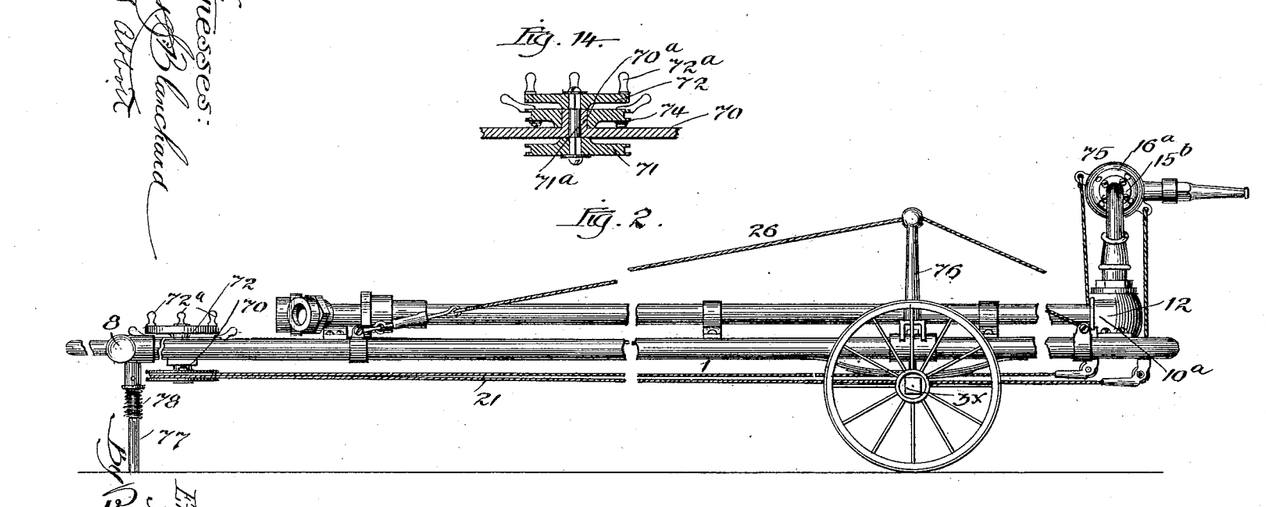
Fig. 2 is a side elevation of the same.
Fig. 14 is a section of the hand wheels and pulleys for operating the nozzle-adjusting cables.

In Figs. 1 and 2 there is shown a simpler form of apparatus for the same purpose and involving in many respects the same details, but without the provision for raising and lowering the pipe and nozzle bodily. In the form shown in these two figures, the pipes, 10, are connected by a fitting, 11, simpler in form than the fitting, 30, shown in the other figures, having diverging branches, $10^b$, at opposite sides, and a middle branch, $10^c$, for hose connection. The pipe structure is mounted fixedly upon the frame structure, 1, being secured by any suitable number of transverse bars, $10^d$. In this form, the pipe and frame being rigidly united, the pulleys and hand wheels for operating the nozzle to adjust its direction horizontally and vertically may be mounted directly on the frame, and are so shown. For this purpose a transverse bar, 70, is bolted to the lower side of the side bars, $1^a$, and has a boss, $70^a$, projecting from its upper surface, the pulley, 71, corresponding to the pulley, 20, of the other construction, and being located below the bar and having its shaft, $71^a$, extended up through the boss and provided at the upper end thereof with a hand-wheel, 72, provided with upstanding handles, $72^a$. The pulley, 74, which corresponds to the pulley, 24, of the other construction is journaled about the boss, $70^a$, above the bar, 70, and is provided with handles, projecting up and outwardly so as to protrude radially beyond the hand wheel, 72. In this construction, since the nozzle cannot be elevated it may be presumed that there will never arise occasion for adjusting it so as to project downwardly, and it can be adjusted to every direction above a horizontal plane through its base by provision for ninety degrees vertical movement in conjunction with rotation through a full circle about its vertical axis; and such ninety degrees of vertical movement can be provided by merely attaching the two plies of the cable, 21, to two lugs, 75, 75, which project at opposite points from the globe base of the nozzle, as seen in Fig. 2. In this simpler form of construction, the frame, 1, is shown mounted by means of the springs, 2, directly upon the axle, $3^x$, the knuckle-joint construction and steering means shown in the other form being dispensed with. Also, there being no occasion for the standards provided on the other construction for carrying the pulleys, 52, they are omitted, and strut posts, 76, 76, are erected directly over the side bars, 1ª, respectively, for the strain cables, 26. In both forms it may be found convenient to provide a leg, 77, at the rear end in proper position to hold the frame horizontal, and this leg is preferably provided with a hinged connection to the frame adapting it to be folded up out of use, as shown in Fig. 4, a spring, 78, being provided to retain it yieldingly in either position to which it may be adjusted.

In the form first described, when the pipe is elevated to the position shown in dotted line in Fig. 4, the friction of the carriage on the frame and of the other joints may be sufficient to prevent the pipe from starting down from its elevated position when the cable is slack for that purpose. In order to insure the prompt lowering of the pipe in response to the proper movement of the cable, there may be provided means for affording yielding resistance to the last portion of the advance movement of the carriage which completes the lifting of the nozzle to the highest position which will react for starting the carriage backward and the pipe downward. Such a device is shown consisting of a spring, 79, inclosed in each of the side bars, 1, stopped at the forward end by any convenient means, as, for example, the bolt, 76, which secures the U-shaped standard, 51, to the frame, a T-fitting, 91, having its stem entered within the coil of the spring and its cross arms projecting out through longitudinal slots, 1ʸ, in the pipe, said cross arms being long enough to be exposed to collision of the side bars of the carriage, 32. The parts may be positioned to cause such encounter to occur a foot or two before the carriage reaches the forward position corresponding to the dotted line position of the pipe shown in Fig. 4, and the reaction of the spring which is compressed during the remainder of the forward travel of the carriage will tend to retract the carriage and the pipe to such a position that the weight of the parts will cause the remainder of the descent as the cable is yielded from the drum.

In some instances and for some reasons it may be preferred to substitute for the cable and operating connections above described for elevating the pipe and nozzle, a screw shaft mounted on the horizontal frame and a traveling nut pivotally mounted on the carriage at the rear end of the pipe. Such construction is shown in Figs. 12 and 13, the screw shaft, 80, being provided with bearings, 81, 82, on the horizontal frame in which the shaft is longitudinally stopped, the shaft having at the rear end a hand wheel, 83, for rotating it. On the shaft, 32ª, of the carriage at the rear end of the nozzle-carrying pipe structure there is pivotally mounted a nut or traveler, 84, apertured and threaded to travel on the screw shaft. The construction of the carriage for engaging the side bars of the frame is unchanged from the last described construction, but all the provisions for operating the cable, 26, of the former construction are omitted. In order to start the pipe structure and nozzle up from the nearly horizontal position of the pipe in this modification there may be journaled upon the horizontal frame at a point substantially directly below the line of pivoting of the brace links, 41, to the pipe structure, a shaft, 85, having cranks, 86, 86, connected by links, 87, 87, with the pivots of the links, 41, to the pipes, 10, respectively. On the shaft, 85, outside the side bars, 1ª, are made fast gears, 88, 88, and a shaft, 89, journaled on the frame bars, 1ª, has secured to it pinions, 88ª, 88ª, meshing with the gears, 88; and crank handles, 90, 90, on the shaft, 89, serve for rotating the latter to rotate the crank shaft, 85, to carry its cranks from the lowest to the highest position, thus elevating the pivot of the brace links, 41, to the pipes, 10, a distance equal to twice the crank length, which may be made great enough to lift the pipes, 10, to a point at which the angle between said pipes and the brace links, 41, shall be such that the longitudinal travel of the nut or traveler, 84, on the screw shaft can be readily effected by rotation of the latter. Inasmuch as the continued elevation of the pipe beyond the limit to which it can be lifted or assisted by the links, 87, will be caused by the continued rotation of the screw shaft after that point of elevation has been reached, it is necessary to provide so that the links, 87, may withdraw from the cranks in the further elevation of the pipe after the cranks reach their highest position, and for that purpose they are engaged with the cranks only by notches, 87ª, in their lower ends. The links will thus hang pendent from the pivots, 41ª, and the position of the pipes is such that in their normal vertical position thus pendent from their pivots they will directly overhang and their lower ends will be in position to engage with the crank wrists when the latter are at their highest position at which they will remain while the pipe is elevated away from them; but the operator will in any event give attention to engaging the links with the cranks when the pipe is lowered, so as to have the assistance of the cranks and their operating devices for relieving the extreme pressure on the nut or traveler, 84, during the closing part of the descent.

The two modes illustrated,—the cable and the screw shaft,—for operating the pipe to elevate and lower the nozzle, it will be understood are designed as instances selected from an obviously wide range of mechanical devices which might be employed for that purpose, and they are not to be understood as limiting the invention to these two particular means, although in the present application in addition to claiming broadly mechanical means for causing longitudinal travel of the rear end of the frame in order to elevate the forward nozzle-carrying end, we desire to claim specifically, as a preferred means, the cable construction shown and described.

We claim:—

1. A hose-nozzle carriage comprising a horizontally extending frame and a pair of wheels on which it is mounted for travel, in combination with a water-supply pipe lodged on the frame and extending longitudinally thereof; a nozzle connected to the pipe at the forward end; a carriage connected to the pipe at the rear end mounted for travel along the frame; a cable connected to the frame at the forward part; a drum about which the cable is wound at the rear part of the frame; a pulley on the frame forward of the travel of the carriage and a pulley on the carriage, the cable intermediate its forward connection to the frame and the drum being extended around both pulleys, and means for rotating the drum.

2. A hose-nozzle carriage comprising a longitudinally extended frame and a pair of wheels on which it is mounted for travel, in combination with a water-supply pipe extending lengthwise of the frame supplied with a nozzle at its forward end and hose connections at its rear end; a carriage mounted for travel on the frame, to which the rear end of the pipe is connected; a link connected to the forward end of the frame and to the pipe intermediate the nozzle and the carriage; a cable connected at one end to the frame and a drum at the rear end of the frame around which the other end of the cable is wound; a pulley on the carriage and a second pulley at a forward position on the frame, the cable being passed around said two pulleys in its course intermediate the drum and its attachment to the frame.

3. A hose-nozzle carriage comprising a horizontally extending frame and wheels on which it is mounted for travel, in combination with a water-supply pipe extending lengthwise of the frame having a discharge nozzle at the forward end and hose connections at the rear end; a carriage mounted on the frame for travel lengthwise thereof connected to the rear end of the pipe; a link pivoted at its forward end on the frame and at its rear end to the pipe intermediate the nozzle and the carriage; a cable connected at one end to a forward point on the frame, and a drum on the rear end of the frame around which the cable is wound, a pulley on the carriage and an elevated pulley forward thereof on the frame, the cable being passed around said two pulleys intermediate its connection with the frame and the drum, and a pulley mounted on the pipe in the vertical plane of the plies of the cable extending between said two previously mentioned pulleys, said plies being deflected under said pulley on the pipe.

4. A hose-nozzle carriage comprising a horizontally extended frame and a pair of wheels on which it is mounted for travel, in combination with a supply pipe extending lengthwise of the frame provided with a nozzle at its forward end and a hose connection at its rear end; a carriage mounted on the frame for travel there-along connected to the rear end of the carriage; a link connected to the forward part of the frame and to the pipe intermediate the nozzle and the carriage; means for propelling the carriage along the frame, and a device affording yielding resistance to the forward movement of the carriage positioned for encounter in the advance movement of the carriage and adapted to react to retract the carriage.

5. A hose-nozzle carriage comprising a horizontally extended frame and a pair of wheels on which it is mounted, in combination with a water-supply pipe extending lengthwise of the frame and having hose connections at its rear end; a fitting swiveled to the pipe at the forward end of the latter for rotation about a vertical axis; a nozzle swiveled to the fitting for rotation about a horizontal axis; a cable connected with the fitting for rotating it on the pipe; another cable connected with the nozzle for rotating it on the fitting; a sheave pulley on the fitting about which the first-mentioned cable extends for rotating the fitting, said sheave pulley having eyes extending through it and guide pulleys mounted on it below the eyes respectively, the nozzle-rotating cable plies extending through said guide eyes and around said guide pulleys respectively.

6. A hose nozzle carriage comprising a horizontally extending frame and a pair of wheels on which it is mounted for travel, in combination with the water-supply pipe lodged on the frame and extending longitudinally thereof; a nozzle connected with the pipe at the forward end, the frame comprising longitudinal parallel side bars; carriages mounted for travel on said side bars, each comprising two wheels, engaged respectively above and below the side bars; a shaft connecting the two carriages, the pipe being pivotally mounted at its rear end on said shaft; two pulleys fast on said shaft at opposite sides; cables connected to the frame at the forward part, one upon each side; a shaft mounted on the rear part of the frame having rigid with it two drums, the cables being connected with said drums respectively for winding thereabout; two pulleys on the frame forward of the travel of the carriage, the cables intermediate their forward connections to the frame and their respective drums being extended around the respective pulleys on the carriage shaft, and means for rotating the drum shaft.

7. A hose-nozzle carriage comprising a frame and a pair of wheels on which it is mounted, in combination with a water-supply pipe extending across the wheel axle and having hose connections at its rear end; a fitting swiveled to the pipe at the forward end of the latter for rotation about a vertical axis; a nozzle swiveled to the fitting for rotation about a horizontal axis; a cable connected with the fitting for rotating it on the pipe; another cable connected with the nozzle for rotating it on the fitting; a sheave pulley on the fitting about which the first mentioned cable extends for rotating the fitting, said sheave pulley having eyes through which the plies of the last mentioned cable respectively extend; cord guide hangers below the sheave swiveled to the latter at such eyes, and cord guide pulleys mounted in the hangers, said hangers having horizontally extended cord run-ways or elongated eyes whose axes are in the plane of rotation of the cord guide pulleys respectively.

8. A hose-cart nozzle comprising a horizontally extended frame; means for supporting same in combination with a water-supply pipe extending lengthwise of the frame and having hose connections at its rear end; a fitting swiveled to the pipe at the forward end of the latter for rotation about a vertical axis; a nozzle swiveled to the fitting for rotation about a horizontal axis; a cable connected with the fitting for rotating it about its vertical axis; another cable connected with the nozzle for rotating it about its horizontal axis; guides for the nozzle-operating cable mounted for rotation with said fitting, the first cable extending from its connection with the nozzle down to said guides and thence about the same along the pipe to the rear end thereof, the second cable extending from the fitting also rearward along the pipe, and means at the rear end of the pipe for operating said cables respectively.

In testimony whereof, we have hereunto set our hands at Chicago, Illinois, this 19th day of August, 1907.

EMANUEL J. PETRU.
JOSEPH ZIDEK.

Witnesses:
THOMAS KRAUS,
JULIA S. ABBOTT.